United States Patent
Witczak et al.

(10) Patent No.: US 11,076,338 B2
(45) Date of Patent: Jul. 27, 2021

(54) CONVEYANCE SYSTEM DATA TRANSFER

(71) Applicant: Otis Elevator Company, Farmington, CT (US)

(72) Inventors: Tadeusz Pawel Witczak, Farmington, CT (US); Craig Drew Bogli, Avon, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/997,803

(22) Filed: Jun. 5, 2018

(65) Prior Publication Data
US 2019/0373530 A1    Dec. 5, 2019

(51) Int. Cl.
| | | |
|---|---|---|
| *H04W 40/12* | (2009.01) | |
| *H04W 40/20* | (2009.01) | |
| *H04W 4/80* | (2018.01) | |
| *H04L 29/06* | (2006.01) | |

(52) U.S. Cl.
CPC .......... *H04W 40/12* (2013.01); *H04W 40/20* (2013.01); *H04L 69/08* (2013.01); *H04W 4/80* (2018.02)

(58) Field of Classification Search
None
See application file for complete search history.

(56) References Cited

U.S. PATENT DOCUMENTS

| | | |
|---|---|---|
| 3,815,711 A | 6/1974 | Hoelscher |
| 5,282,239 A | 1/1994 | Yokoi et al. |
| 6,526,368 B1 | 2/2003 | Coste et al. |
| 6,598,710 B2 | 7/2003 | Motoyama et al. |
| 6,601,679 B2 | 8/2003 | Crenella et al. |
| 7,077,244 B2* | 7/2006 | Oh .......................... B66B 1/40 187/394 |
| 7,597,176 B2 | 10/2009 | Zaharia |
| 8,385,943 B1 | 2/2013 | Han et al. |
| 8,620,339 B2 | 12/2013 | McCormick |
| 8,797,141 B2 | 8/2014 | Best et al. |
| 8,909,258 B2 | 12/2014 | Tidd et al. |
| 8,938,255 B2 | 1/2015 | Tsruya et al. |
| 9,113,434 B2 | 8/2015 | Wirola et al. |
| 9,234,958 B2 | 1/2016 | Syrjarinne et al. |

(Continued)

FOREIGN PATENT DOCUMENTS

| | | |
|---|---|---|
| EP | 1158697 A1 | 11/2001 |
| EP | 2840051 A1 | 2/2015 |

(Continued)

OTHER PUBLICATIONS

Cisco, "Cisco Unified Wireless Network Design Guide for Nokia Eseries Phones", available at: www.cisco.com/c/en/us/td/docs/wireless/technology/nokia/design/guide/nokia.html#wp39046, Dec. 21, 2009, 45 pages.

(Continued)

*Primary Examiner* — Gregory B Sefcheck
*Assistant Examiner* — Srinivasa R Reddivalam
(74) *Attorney, Agent, or Firm* — Cantor Colburn LLP

(57) ABSTRACT

A method for data transfer in a conveyance system includes moving a conveyance system component along a travel path, the conveyance system component including a memory; and transferring data, by at least one of sending data from the memory or receiving data to the memory, in response to available network signal strength.

14 Claims, 6 Drawing Sheets

(56) References Cited

U.S. PATENT DOCUMENTS

| | | |
|---|---|---|
| 9,380,425 B2 | 6/2016 | Meredith et al. |
| 9,658,313 B2 | 5/2017 | Jarvis et al. |
| 9,883,352 B2 | 1/2018 | Wirola et al. |
| 2002/0189907 A1 | 12/2002 | Motoyama et al. |
| 2007/0041352 A1* | 2/2007 | Frankel .................. B66B 1/468 370/338 |
| 2014/0045479 A1 | 2/2014 | Shinada et al. |
| 2016/0176678 A1* | 6/2016 | Kusserow ............. B66B 5/0018 187/393 |
| 2016/0185568 A1* | 6/2016 | Kusserow ......... H04W 52/0203 340/3.31 |
| 2016/0272460 A1 | 9/2016 | Simcik et al. |
| 2017/0174471 A1 | 6/2017 | Salmikuukka et al. |
| 2017/0291800 A1 | 10/2017 | Scoville et al. |
| 2019/0115943 A1* | 4/2019 | Rytilae ............... H04B 7/15507 |
| 2020/0130990 A1* | 4/2020 | Mustonen ................ B66B 1/28 |

FOREIGN PATENT DOCUMENTS

| | | |
|---|---|---|
| EP | 3190075 A1 | 7/2017 |
| WO | 2005053189 A1 | 6/2005 |
| WO | 2013070170 A1 | 5/2013 |
| WO | 2017216413 A1 | 12/2017 |

OTHER PUBLICATIONS

European Search Report for application EP 19178558.3, dated Nov. 7, 2019, 11 pages.

\* cited by examiner

CONVEYANCE SYSTEM DATA TRANSFER

BACKGROUND

The embodiments described herein relate to the field of conveyance systems, and specifically to a method and apparatus for transferring data in a conveyance system.

Conveyance systems, such as, for example, elevator systems, escalator systems, and moving walkways, may need to communicate with other devices or systems in a wireless manner. Often, the available network signal strength varies as a conveyance system component moves along a travel path, such as vertically in an elevator hoistway. The available network signal strength can be too low for effective wireless communication at certain locations along the travel path.

BRIEF SUMMARY

According to an embodiment, a method for data transfer in a conveyance system includes moving a conveyance system component along a travel path, the conveyance system component including a memory; and transferring data, by at least one of sending data from the memory or receiving data to the memory, in response to available network signal strength.

In addition to one or more of the features described herein, or as an alternative, further embodiments may include mapping locations of the conveyance system component along the travel path to network signal strength.

In addition to one or more of the features described herein, or as an alternative, further embodiments may include wherein the transferring data comprises at least one of sending data from the memory to a remote system through a second conveyance system component or receiving data from the remote system to the memory through the second conveyance system component.

In addition to one or more of the features described herein, or as an alternative, further embodiments may include wherein the transferring data from the memory to the remote system comprises transferring data from the memory to the second conveyance system component, storing the data at the second conveyance system component and transferring the data to the remote system upon the second conveyance system component reaching a location having network signal strength greater than a threshold.

In addition to one or more of the features described herein, or as an alternative, further embodiments may include wherein the transferring data comprises determining that a data transfer is needed; and determining whether the conveyance system component will reach a location having network signal strength greater than a threshold within a time limit.

In addition to one or more of the features described herein, or as an alternative, further embodiments may include wherein when the conveyance system component will reach the location having network signal strength greater than the threshold within the time limit, transferring data upon the conveyance system component reaching the location having network signal strength greater than the threshold.

In addition to one or more of the features described herein, or as an alternative, further embodiments may include wherein when the conveyance system component will not reach the location having network signal strength greater than the threshold within the time limit, taking action to modify the data.

In addition to one or more of the features described herein, or as an alternative, further embodiments may include wherein when the conveyance system component will not reach the location having network signal strength greater than the threshold within the time limit, initiating movement of the conveyance system component to the location having network signal strength greater than the threshold.

In addition to one or more of the features described herein, or as an alternative, further embodiments may include wherein the transferring data comprises communicating with a local gateway using short-range communications protocols.

In addition to one or more of the features described herein, or as an alternative, further embodiments may include wherein the transferring data comprises communicating with a remote system using long-range communications protocols.

According to another embodiment, a conveyance system includes a conveyance system component configured to move a passenger along a travel path, the conveyance system component including a memory and a controller; the controller configured to perform transferring data, by at least one of sending data from the memory or receiving data to the memory, in response to available network signal strength.

In addition to one or more of the features described herein, or as an alternative, further embodiments may include wherein the controller is configured to map locations of the conveyance system component along the travel path to network signal strength.

In addition to one or more of the features described herein, or as an alternative, further embodiments may include wherein the transferring data comprises at least one of sending data from the memory to a remote system through a second conveyance system component or receiving data from the remote system to the memory through a second conveyance system component.

In addition to one or more of the features described herein, or as an alternative, further embodiments may include wherein the transferring data from the memory to the remote system comprises transferring data from the memory to the second conveyance system component, storing the data at the second conveyance system component and transferring the data to the remote system upon the second conveyance system component reaching a location having network signal strength greater than a threshold.

In addition to one or more of the features described herein, or as an alternative, further embodiments may include wherein the transferring data comprises: determining that a data transfer is needed; and determining whether the conveyance system component will reach a location having network signal strength greater than a threshold within a time limit.

In addition to one or more of the features described herein, or as an alternative, further embodiments may include wherein when the conveyance system component will reach the location having network signal strength greater than the threshold within the time limit, transferring data upon the conveyance system component reaching the location having network signal strength greater than the threshold.

In addition to one or more of the features described herein, or as an alternative, further embodiments may include wherein when the conveyance system component will not reach the location having network signal strength greater than the threshold within the time limit, taking action to modify the data.

In addition to one or more of the features described herein, or as an alternative, further embodiments may include wherein when the conveyance system component will not reach the location having network signal strength greater than the threshold within the time limit, initiating movement of the conveyance system component to the location having network signal strength greater than the threshold.

In addition to one or more of the features described herein, or as an alternative, further embodiments may include wherein the transferring data comprises communicating with a local gateway using short-range communications protocols.

In addition to one or more of the features described herein, or as an alternative, further embodiments may include wherein the transferring data comprises communicating with a remote system using long-range communications protocols.

Technical effects of embodiments of the present disclosure include determining network signal strength along a travel path of a conveyance system component to determine at what location along the travel path data transfer over one or more wireless networks should occur.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
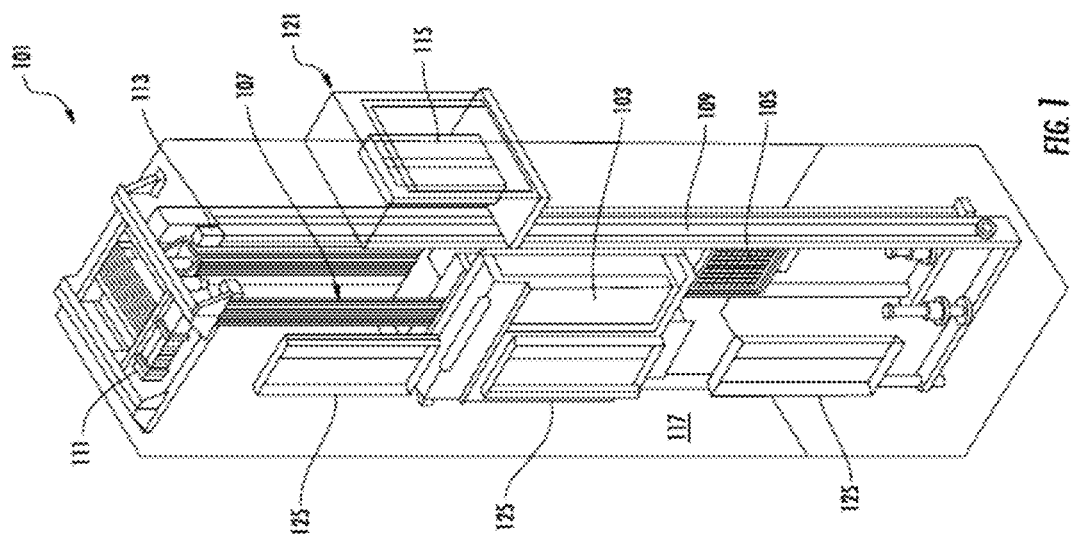
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a system controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The system controller 115 is located, as shown, in a controller room 121 of the elevator shaft 117 and is configured to control the operation of the elevator system 101, and particularly the elevator car 103. For example, the system controller 115 may provide drive signals to the machine 111 to control the acceleration, deceleration, leveling, stopping, etc. of the elevator car 103. The system controller 115 may also be configured to receive position signals from the position reference system 113 or any other desired position reference device. When moving up or down within the elevator shaft 117 along guide rail 109, the elevator car 103 may stop at one or more landings 125 as controlled by the system controller 115. Although shown in a controller room 121, those of skill in the art will appreciate that the controller 115 can be located and/or configured in other locations or positions within the elevator system 101. In one embodiment, the system controller 115 may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1. In one example, embodiments disclosed herein may be applicable conveyance systems such as an elevator system 101 and a conveyance system component such as an elevator car 103 of the elevator system 101. In another example, embodiments disclosed herein may be applicable conveyance systems such as an escalator system and a conveyance system component such as a moving stair of the escalator system.

Figure 2:
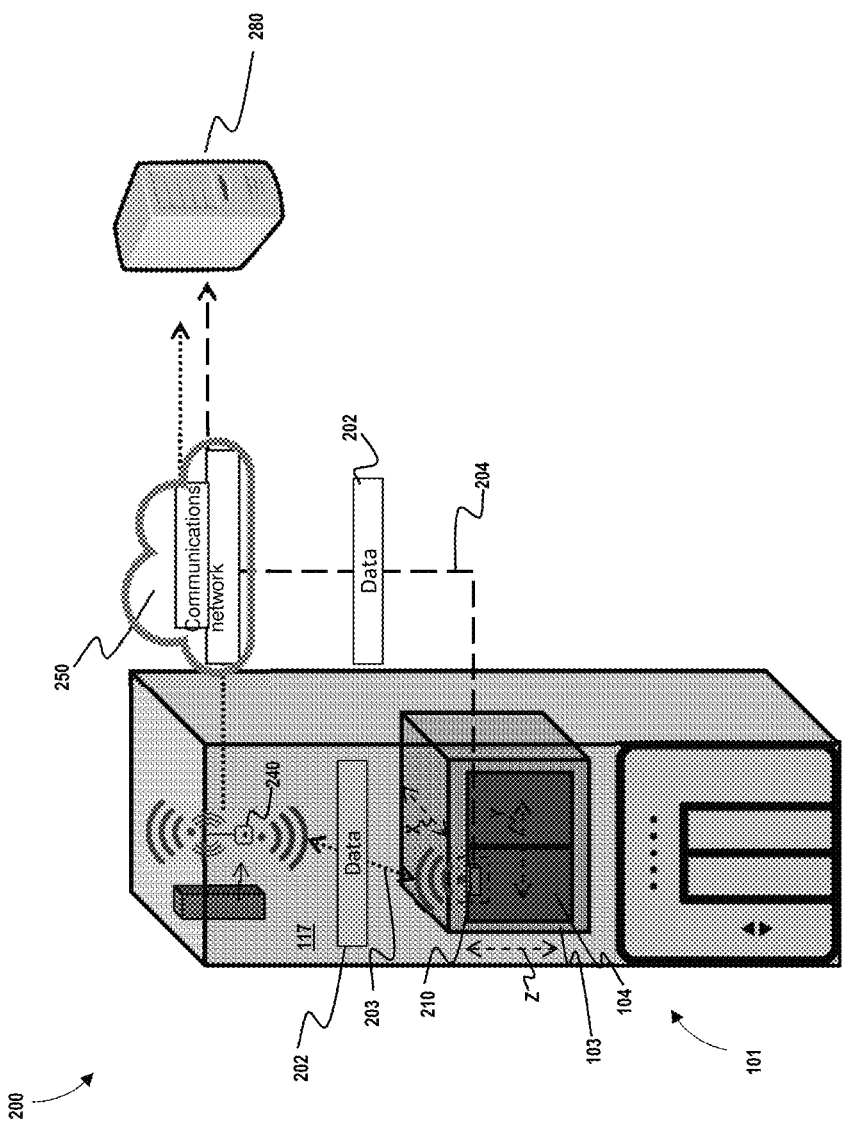
FIG. 2 is a schematic illustration of a sensor system for the elevator system of FIG. 1, in accordance with an embodiment of the disclosure.

FIG. 2 is a view of a sensor system 200 including a sensing apparatus 210, according to an embodiment of the present disclosure. The sensing apparatus 210 is configured to detect data 202 of the elevator car 103 and transmit the data 202 to a remote system 280 over communications network 250. In an embodiment, the sensing apparatus 210 is configured to process the data 202 prior to transmitting the data 202 to the remote system 280. The processing of the data 202 may reveal data, such as, for example, a number of elevator door openings/closings, elevator door time, vibrations, a number of elevator rides, elevator ride performance, and elevator flight time. The remote system 280 may be a computing device, such as, for example, a desktop computer, server, etc. The remote system 280 may also be a mobile computing device that is typically carried by a person, such as, for example a smartphone, PDA, smartwatch, tablet, laptop, etc. The remote system 280 may also be two separate devices that are synced together, such as, for example, a cellular phone and a desktop computer synced over an internet connection. The remote system 280 may use data from the sensing apparatus 210 for predictive maintenance analysis. The remote system 280 may also be implemented using a distributed computing platform (e.g., cloud computing).

The sensing apparatus 210 is configured to transmit the data 202 to the remote system 280 via short-range wireless protocols 203 and/or long-range wireless protocols 204. Short-range wireless protocols 203 may include but are not limited to Bluetooth, Wi-Fi, HaLow (801.11ah), Wireless M-Bus, Zigbee, zWave. Using short-range wireless protocols 203, the sensing apparatus 210 is configured to transmit the data 202 to a local gateway device 240. The local gateway device 240 is configured to transmit the data 202 to the remote system 280 through a communications network 250. The communications network 250 may be a cellular network, satellite network, wired network, or any other communications network known to one of skill in the art. Using long-range wireless protocols 204, the sensing apparatus 210 is configured to transmit the data 202 to the remote system 280 through the communications network 250. Long-range wireless protocols 204 may include but are not limited to cellular, GSM, CDMA, LTE (NB-IoT, CAT M1), LoRa, or SigFox.

FIG. 2 shows a possible installation location of the sensing apparatus 210 within the elevator system 101. In an embodiment, the sensing apparatus 210 may be attached to a door 104 of the elevator car 103. Advantageously, by attaching the sensing apparatus 210 to the door 104 of the elevator car 103 the sensing apparatus 210 may detect accelerations of the elevator car 103 and the doors 104 of the elevator car 103. For example, when located on the door 104, the sensing apparatus 210 may detect when the elevator car 103 is in motion, when the elevator car 103 is slowing, when the elevator car 103 is stopping, and when the doors 104 open to allow passengers to exit and enter the elevator car 103. It is understood that the sensing apparatus 210 may also be installed in other locations other than a door 104 of the elevator system 101. The sensing apparatus 210 may be configured to detect acceleration in any number of directions. In an embodiment, the sensing apparatus may detect accelerations in three directions, a first direction X, a second direction Y, and a third direction Z, as show in FIG. 2. The first direction X may be perpendicular to the doors 104 of the elevator car 103, as shown in FIG. 2. The second direction Y may be parallel to the doors 104 of the elevator car 103, as shown in FIG. 2. The third direction Z may be aligned vertically parallel with the elevator shaft 117 and pull of gravity, as shown in FIG. 2.

Figure 3:
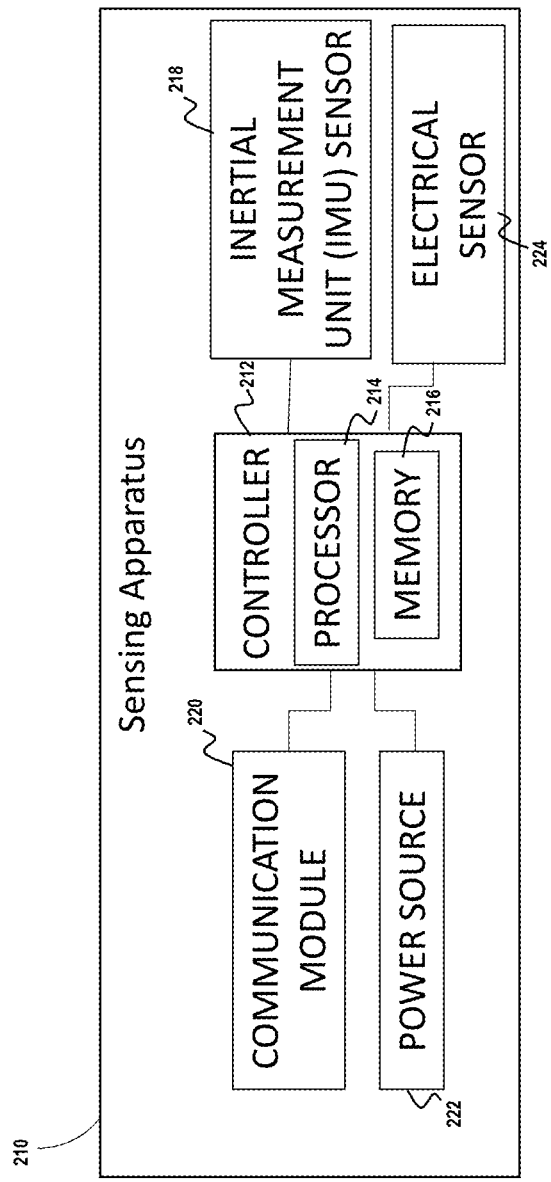
FIG. 3 is a schematic illustration of a sensing apparatus of the sensor system of FIG. 2, in accordance with an embodiment of the disclosure.

FIG. 3 illustrates a block diagram of the sensing apparatus 210 of the sensing system 200 of FIG. 2. It should be appreciated that, although particular systems are separately defined in the schematic block diagram of FIG. 3, each or any of the systems may be otherwise combined or separated via hardware and/or software. As shown in FIG. 3, the sensing apparatus 210 may include a controller 212, an inertial measurement unit (IMU) sensor 218 in communication with the controller 212, an electrical sensor 224 in communication with the controller 212, a communication module 220 in communication with the controller 212, and a power source 222 electrically connected to the controller 212.

The IMU sensor 218 is configured to detect acceleration data 202 of the sensing apparatus 210 and the elevator car 103 when the sensing apparatus 210 is attached to the elevator car 103. The IMU sensor 218 may be a sensor, such as, for example, an accelerometer, a gyroscope, or a similar sensor known to one of skill in the art. The IMU sensor 218 may detect accelerations as well as derivatives or integrals of accelerations, such as, for example, velocity, jerk, jounce, snap . . . etc. The IMU sensor 218 is in communication with the controller 212 of the sensing apparatus 210. The electrical sensor 224 is configured to detect electrical data of a component of the electrical car 103 (e.g., current drawn by lighting, operating, panel). As mentioned above, the sensing apparatus 210 may also be located on a wire or machine of a component directly to allow non-intrusive measurements of power, current, and voltage using the electrical sensor 224. The electrical sensor 224 may use various electrical sensors to detect electrical data, such as, for example, Hall Effect sensors, inductive sensors, capacitive sensors, or any other electrical sensor known to one of skill in the art. Other types of sensors may be used in the sensing apparatus 210 to detect a variety of parameters, such as microphones to detect audio, cameras to detect video, temperatures sensors to detect temperature, etc.

The controller 212 of the sensing apparatus 210 includes a processor 214 and an associated memory 216 comprising computer-executable instructions that, when executed by the processor 214, cause the processor 214 to perform various operations, such as, for example, processing the data 202 collected by the IMU sensor 218 or electrical data collected by the electrical sensor 224. The processor 214 may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 216 may be a storage device, such as, for example, a random access memory (RAM), read only memory (ROM), or other electronic, optical, magnetic or any other computer readable medium.

The power source 222 of the sensing apparatus 210 is configured to store and supply electrical power to the sensing apparatus 210. The power source 222 may include an energy storage system, such as, for example, a battery system, capacitor, or other energy storage system known to one of skill in the art. The power source 222 may also generate electrical power for the sensing apparatus 210. The power source 222 may also include an energy generation or electricity harvesting system, such as, for example synchronous generator, induction generator, or other type of electrical generator known to one of skill in the art. The power source 222 may also be a wired connection to a permanent source.

The sensing apparatus 210 includes a communication module 220 configured to allow the controller 212 of the sensing apparatus 210 to communicate with the remote system 280 through at least one of short-range wireless protocols 203 and long-range wireless protocols 204. The communication module 220 may be configured to communicate with the local gateway device 240 using short-range wireless protocols 203, such as, for example, Bluetooth, Wi-Fi, HaLow (801.11ah), Wireless M-Bus Zigbee, zWave or other short-range wireless protocol known to one of skill in the art. Using short-range wireless protocols 203, the communication module 220 is configured to send/receive the data 202 with a local gateway device 240. The local gateway device 240 is configured to send/receive data with the remote system 280 through the communications network 250, as described above. The communication module 220 may be configured to communicate with the remote system 280 using long-range wireless protocols 204, such as for example, cellular, GSM, CDMA, LTE (NB-IoT, CAT M1), LoRa, SigFox, satellite, or other long-range wired and/or wireless protocols known to one of skill in the art. Using long-range wireless protocols 204, the communication module 220 is configured to transmit the acceleration data 202 to the remote device 280 through the network 250.

It is noted that the data 202 in memory 216 is not limited to acceleration data from the IMU sensor 218. Data from other sources, such as data communicated to and from the elevator car 103 may be stored in the memory 216. For example, data for an in-car display may be sent to the elevator car 103 for storage in the memory 216. As such, embodiments are not limited to data sent from the elevator car 103, but data that is either sent from the elevator car 103 or received at the elevator car 103, regardless of the nature of the data.

Figure 4:
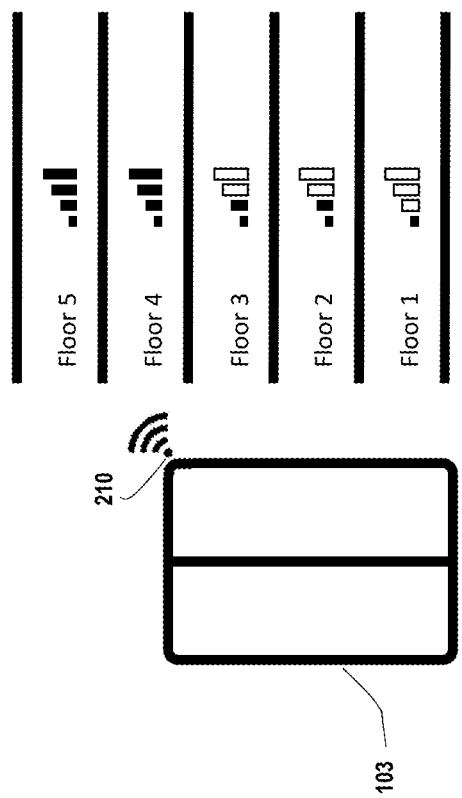
FIGS. 4 and 5 illustrate detecting network signal strength, in accordance with an embodiment of the disclosure.

As the conveyance system component travels, the sensing apparatus 210 collects data and stores the data in memory 216. For example, in an elevator system, the conveyance system component (e.g., the elevator car) travels along a hoistway and will experience different signal strengths for different available networks along the hoistway. FIG. 4 depicts a representation of network signal strength as the elevator car 103 travels along floors 1-5. As shown, the network signal strength is greatest on floors 4 and 5. As described further herein, the controller 212 may defer sending or receiving data until the network signal strength is best or above a threshold. The best network signal strength may be provided by either the short-range wireless protocols 203 or the long-range wireless protocols 204, depending on the location of the elevator car 103. For example, at the lobby floor, a local 802.11xx network may provide the best network signal strength whereas at the upper floors, a GSM network may provide the best network signal strength. Controller 212 may transmit the data in different formats dependent upon the available network signal strength.

Figure 5:
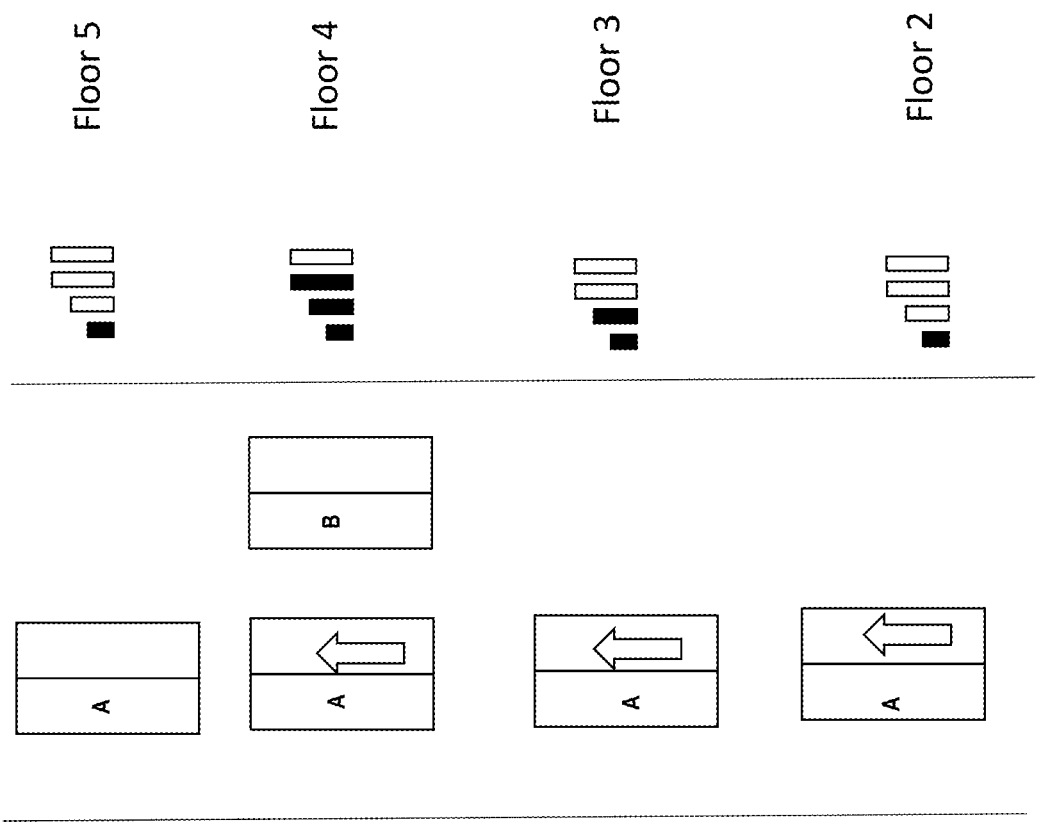

Furthermore, proximity to other conveyance system components may affect the network signal strength. FIG. 5 shows an example of elevator car A traveling upwards. As elevator car A passes elevator car B, the available network signal strength increases as elevator car B is connected to a wireless network with a strong network signal strength. When elevator car A is proximate to elevator car B, elevator car A will send/receive data through elevator car B. Thus, the network signal strength can vary with location of the elevator system component with respect to fixed locations along a travel path (e.g., floors) and the location of two or more elevator system components being proximate to each other (e.g., two or more elevator cars).

The proximity of conveyance system components may be used to aid data transfer. For example, elevator cars that serve only low floors (e.g., floors 1-9) may infrequently have a suitable available network signal strength to send/receive data directly. In such cases, elevator cars serving low floors would only send/receive data when proximate to elevator cars serving mid-rise floors (e.g., floors 8-20). The data may be sent/received from the source to the destination immediately (from car A, to car B to the remote system 280). Alternatively, the data may be sent from a source (e.g., a first conveyance system component) to a second conveyance system component, stored in memory on the second conveyance system component, and then transmitted from the second conveyance system component to the destination (e.g., the remote system 280) at a later time. For example, referring to FIG. 5, data from the remote system 280 may be sent to car B, buffered in the memory of car B, and then sent to the memory in car A upon cars A and B being proximate to each other, and vice versa.

Figure 6:
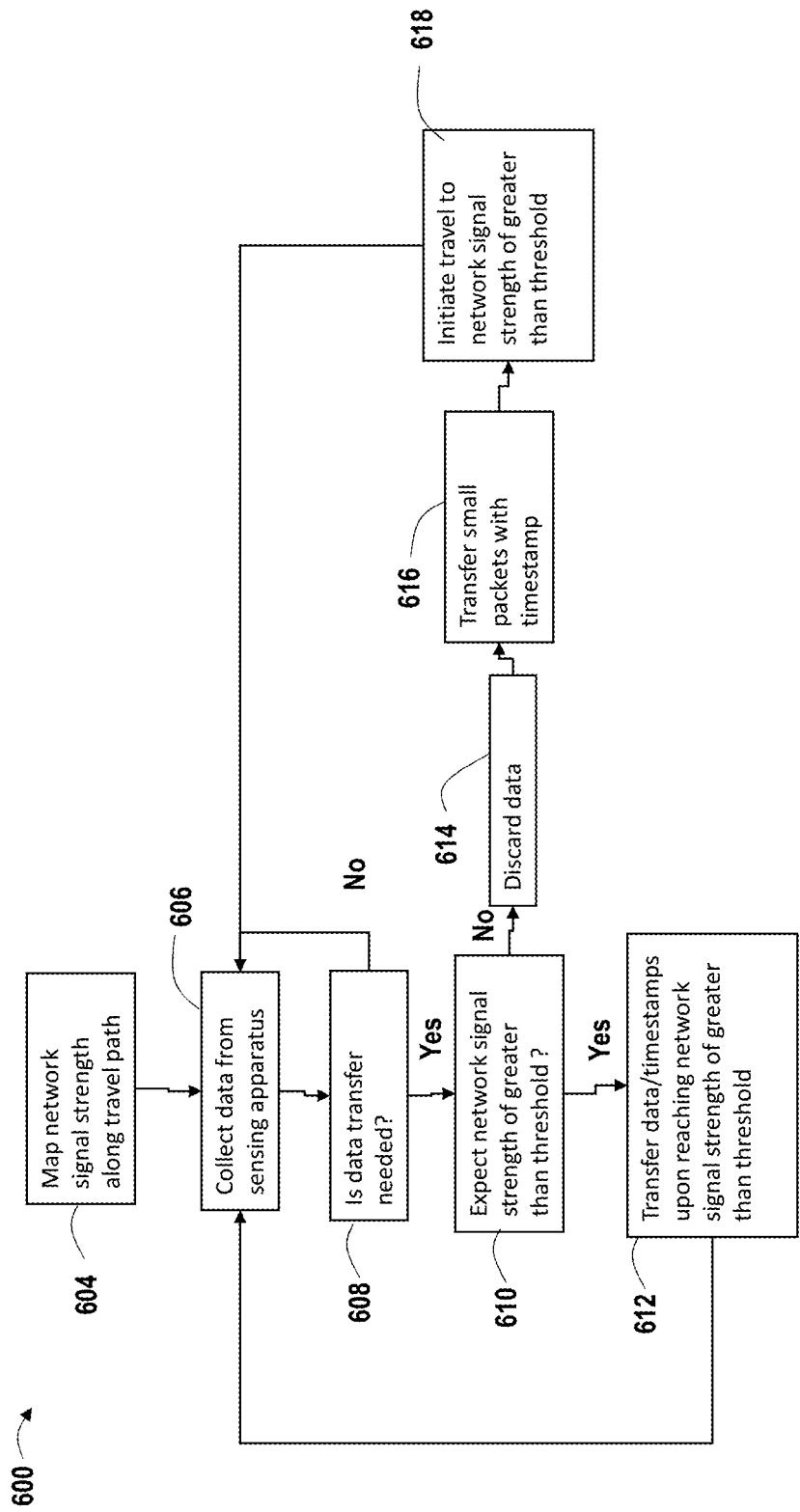
FIG. 6 is a flow chart of a method of data transfer, in accordance with an embodiment of the disclosure.

FIG. 6 is a flow chart of a method 600 of data transfer in accordance with an embodiment of the disclosure. The process begins at 604 where a conveyance system component fitted with the sensing apparatus 210 is moved along a travel path and the network signal strength is measured and stored for various locations. The network signal strength may be communicated using known techniques, such as RSSI. For example, an elevator car 103 may be moved up and down a hoistway while the controller 212 measures the network signal strength at each floor. The mapping may also take into account the effect of proximate conveyance system components, such as the example in FIG. 5. For example, the mapping may include how proximity of an elevator car to a counterweight or other elevator car affects network signal strength. This mapping of locations to network signal strength may be stored in memory 216, in system controller 115, or both.

At 606, the conveyance system operates in typical fashion and the sensing apparatus 210 collects data and stores that data in memory 216. If the conveyance system is an elevator, the data may include one ore more of a number of elevator door openings/closings, elevator door time, vibrations, a number of elevator rides, elevator ride performance, and elevator flight time, a time stamp and a network signal strength at locations. The data may include other data such as temperature data, audio/video data, etc.

At 608, the controller 212 of sensing apparatus 210 determines if a data transfer is needed to or from memory 216. When sending data, the controller 212 may monitor the capacity of memory 216 and if the capacity reaches some capacity limit (e.g., only 5% of memory left), the controller 212 determines that a data transfer is needed. When receiving data, the controller 212 may receive a communication request from the data source (e.g., the remote system 280). For example, the remote system 280 may wish to update in-car display data. If no data transfer is needed, flow proceeds back to 606.

If a data transfer is needed, flow proceeds to 610 where it is determined whether the conveyance system component (e.g., the elevator car) is expected to reach a location having a network signal strength greater than a threshold (e.g., −70 db) within a certain time. The time may be a fixed value (e.g., one hour) or may be dependent on the rate at which capacity of memory 216 is being consumed. In one embodiment, the controller 212 communicates with elevator controller 115 to determine if the elevator car 103 is expected to travel to a location having a network signal strength greater than the threshold. The location may be a specified floor or may be a location where a first conveyance system component (e.g., car A) is near a second conveyance system component (e.g., car B). In another embodiment, the controller 212 may also be programmed to know that at certain times of day (9 Am, noon and 5 pm) the elevator car 103 is expected to traverse all locations (e.g., floors) and thus the elevator car 103 will travel to a floor having a network signal strength greater than the threshold at those times. If at 610, the conveyance system component is expected to reach a location having a network signal strength greater than a threshold within a certain time, flow proceeds to 612. At 612, the controller 212 transfers data to/from the memory 216, including any data timestamps, at the location having the network signal strength greater than the threshold.

If at 610, the conveyance system component (e.g., the elevator car) is not expected to reach a location having a network signal strength greater than a threshold (e.g., −70 db) within a certain time, then one or more actions to affect the data transmission may be taken. At 614, the controller 212 may delete certain data from the memory 216. At 616, the controller 212 may send smaller packets of data along with a timestamp using the lower quality network. The data in memory 216 may be repackaged for transmission using smaller packages when the conveyance system component is in a lower signal strength zone. The data transmission may be modified to transmit data with a higher priority first when the conveyance system component is in a lower signal strength zone. This allows some data to be transferred without delaying passenger travel on the conveyance system. At 618, the controller 212 may initiate travel of the conveyance system component to a location having a network signal strength greater than a threshold (e.g., −70 db). This may be achieved by the controller 212 sending a request to the system controller 115 to move the conveyance system component to a specified location.

In other embodiments, the controller 212 may store multiple thresholds corresponding to a plurality of network signal strengths. If the available network signal strength is greater than a high threshold (e.g., −70 db), then the data may be sent in full. If the available network signal strength is not greater than a high threshold, but greater than a lower threshold (e.g., −85 db), then the data may be sent in a modified form (e.g., some packets deleted, only high priority data sent, etc.).

It is noted that the mapping of 610 may be performed as the conveyance system is operating in its normal fashion. As the network signal strength is measured by the sensing apparatus 210 regularly, the mapping of location to network signal strength may be done repeatedly, and the mapping updated over time.

While the above description has described the flow process of FIG. 6 in a particular order, it should be appreciated that unless otherwise specifically required in the attached claims that the ordering of the steps may be varied.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

As described above, embodiments can be in the form of processor-implemented processes and devices for practicing those processes, such as a processor 214 in sensing apparatus 210. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method for data transfer in a conveyance system, the method comprising:
moving a conveyance system component along a travel path, the conveyance system component including a memory;
mapping at least one location of the conveyance system component along the travel path to network signal strength, the conveyance system component including a sensing apparatus moved along the travel path, the mapping performed in response to the sensing apparatus measuring the network signal strength at the at least one location; and
transferring data, by at least one of sending data from the memory or receiving data to the memory, in response to available network signal strength;
wherein the transferring data comprises:
determining that a data transfer is needed; and
determining whether the conveyance system component will reach a location having network signal strength greater than a threshold within a time limit;
wherein when the conveyance system component will not reach the location having network signal strength greater than the threshold within the time limit, initiating movement of the conveyance system component to the location having network signal strength greater than the threshold;

wherein the location having network signal strength greater than the threshold is a non-lobby location.

2. The method of claim 1, wherein the transferring data comprises at least one of sending data from the memory to a remote system through a second conveyance system component or receiving data from the remote system to the memory through the second conveyance system component.

3. The method of claim 2, wherein the transferring data from the memory to the remote system comprises transferring data from the memory to the second conveyance system component, storing the data at the second conveyance system component and transferring the data to the remote system upon the second conveyance system component reaching a location having network signal strength greater than a threshold.

4. The method of claim 1, wherein when the conveyance system component will reach the location having network signal strength greater than the threshold within the time limit, transferring data upon the conveyance system component reaching the location having network signal strength greater than the threshold.

5. The method of claim 1, wherein when the conveyance system component will not reach the location having network signal strength greater than the threshold within the time limit, taking action to modify the data.

6. The method of claim 1, wherein the transferring data comprises communicating with a local gateway using short-range communications protocols.

7. The method of claim 1, wherein the transferring data comprises communicating with a remote system using long-range communications protocols.

8. A conveyance system comprising:
a conveyance system component configured to move a passenger along a travel path, the conveyance system component including a memory and a controller;
wherein the controller is configured to map at least one location of the conveyance system component along the travel path to network signal strength, the conveyance system component including a sensing apparatus moved along the travel path, the controller configured to map the at least one location of the conveyance system component along the travel path to network signal strength mapping in response to network signal strength measured by the sensing apparatus;
the controller configured to perform transferring data, by at least one of sending data from the memory or receiving data to the memory, in response to available network signal strength;
wherein the transferring data comprises:
determining that a data transfer is needed; and
determining whether the conveyance system component will reach a location having network signal strength greater than a threshold within a time limit;
wherein when the conveyance system component will not reach the location having network signal strength greater than the threshold within the time limit, initiating movement of the conveyance system component to the location having network signal strength greater than the threshold;
wherein the location having network signal strength greater than the threshold is a non-lobby location.

9. The conveyance system of claim 8, wherein the transferring data comprises at least one of sending data from the memory to a remote system through a second conveyance system component or receiving data from the remote system to the memory through the second conveyance system component.

10. The conveyance system of claim 9, wherein the transferring data from the memory to the remote system comprises transferring data from the memory to the second conveyance system component, storing the data at the second conveyance system component and transferring the data to the remote system upon the second conveyance system component reaching a location having network signal strength greater than a threshold.

11. The conveyance system of claim 8, wherein when the conveyance system component will reach the location having network signal strength greater than the threshold within the time limit, transferring data upon the conveyance system component reaching the location having network signal strength greater than the threshold.

12. The conveyance system of claim 8, wherein when the conveyance system component will not reach the location having network signal strength greater than the threshold within the time limit, taking action to modify the data.

13. The conveyance system of claim 8, wherein the transferring data comprises communicating with a local gateway using short-range communications protocols.

14. The conveyance system of claim 8, wherein the transferring data comprises communicating with a remote system using long-range communications protocols.

* * * * *